Nov. 25, 1924.

G. E. HARTLEY 1,516,921

APPARATUS FOR EXHIBITING PICTURES, ADVERTISEMENTS, AND THE LIKE

Filed March 10, 1924    2 Sheets-Sheet 1

Inventor
G. E. Hartley,
by
W. E. Evans,
Attorney.

Patented Nov. 25, 1924.

1,516,921

UNITED STATES PATENT OFFICE.

GEORGE ERNEST HARTLEY, OF WATFORD, ENGLAND.

APPARATUS FOR EXHIBITING PICTURES, ADVERTISEMENTS, AND THE LIKE.

Application filed March 10, 1924. Serial No. 698,203.

*To all whom it may concern:*

Be it known that I, GEORGE ERNEST HARTLEY, a subject of the King of Great Britain and Ireland, residing at 16 Grosvenor Road, Watford, Hertfordshire, England, have invented certain new and useful Improvements Relating to Apparatus for Exhibiting Pictures, Advertisements, and the like, of which the following is a specification.

This invention relates to apparatus for exhibiting pictures, advertisements and the like, of the kind comprising a series of separate elements disposed in the same plane and exhibiting parts of the pictures, advertisements or the like in such manner as apparently to present an unbroken picture surface and in which the elements are adapted to receive in succession an intermittent angular movement for the exposure of the parts of a fresh picture, advertisement or the like.

In such apparatus the said movement of the elements is advantageously effected by means of a travelling endless chain or the like having projections which are adapted to engage and turn the elements in succession, while it is further of advantage to provide the parts of the pictures, advertisements or the like upon endless bands each of which passes around one of the series of elements before referred to and also around an element of a second series of elements. By such a construction the advertising capacity of the apparatus may be greatly increased.

The invention has among its objects to provide an improved apparatus of the kind described in which simple and effective means are adapted to conceal the intermittent movement of the elements necessary for the successive exposure of the pictures, advertisements or the like, and generally to provide simple and effective constructions of advertising apparatus.

According to the invention I provide a moving lath, screen or the like disposed parallel with the respective rotatable elements and adapted to move in front thereof and to be so set that as the latch, screen or the like comes to lie in front of each rotating, element that element is moved, so that thus in the operation of the apparatus the illusion is presented of the new picture, advertisement or the like being exposed by the lath, screen or the like. The lath may be divided into parts which are connected together after the manner of a blind, to serve as a flexible screen.

Apparatus constructed in accordance with the invention are hereinafter described with reference to the accompanying diagrammatic drawings by way of example.

Figure 1:
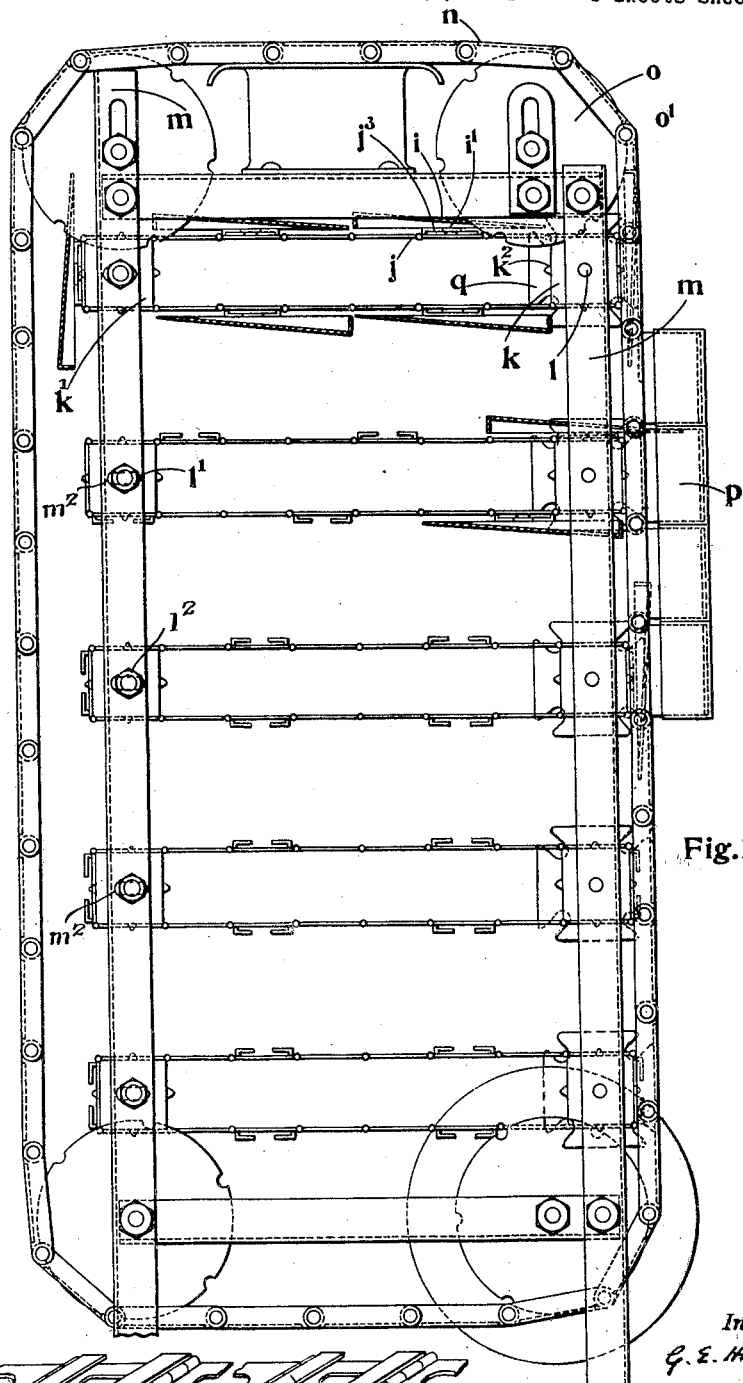
Fig. 1 is a side elevation of an apparatus according to the invention provided with rotatable elements carrying endless bands the front of the apparatus being shown at the right hand side of the drawing.
Figure 2:
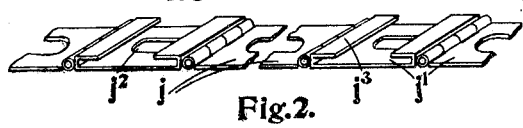
Fig. 2 is a detail view of an endless band and Fig. 3 is a detail view in perspective illustrating the arrangement of the principal elements necessary for the operation of the apparatus.

In carrying the invention into effect in the manner illustrated in the drawings, the parts or sections of the pictures, advertisements or the like are mounted upon slats $i$ of wood, metal or other suitable material, carried by and between two endless bands or chains $j$ which are carried upon pairs of rotatable elements $kk^1$ of square section. The pairs of elements $k$ at the front of the apparatus are mounted fixedly upon corresponding spindles $l$ carried in bearings $m^1$ formed in the frame members $m$. The elements $k^1$ at the rear of the apparatus may be carried upon stub spindles $l^1$ mounted upon the rear frame members $m$. The stub spindles $l^1$ may, however, be mounted in such manner as to permit of their adjustment towards and away from the front of the apparatus, for example, the stub spindles $l^1$ may be mounted in slots $m^2$ in the rear frame members and may be locked in the adjusted position by means of lock nuts $l^2$.

The endless bands $j$ are advantageously provided of sheet metal links $j^1$ of length corresponding to the length of the sides of the section of the elements $kk^1$ and each being provided with a centrally disposed hole $j^2$ for the engagement of pins or projections $k^2$ provided upon the elements. The slats $i$ are advantageously provided of a width which is a multiple of the length of the side of the section of the elements $kk^1$ and the several pairs of elements $kk^1$ are disposed upon the frame members $m$ in such positions that the slats carried by the corresponding bands form a continuous surface when at the front of the apparatus. In the construction illustrated the slats are provided of a width approximately three times the length of the side of the section of the elements $kk^1$ and are supported at the middle of their width by means of plates $i^1$ or extensions which are introduced between the finger or clips $j^3$ of the endless bands, the said plates $i^1$ being slotted as at $i^2$ (Fig. 3); to permit the engagement of the pins $k^2$. Two endless bands or chains $n$ are provided to be carried upon corresponding chain wheels $o$ mounted on spindles suitably carried in bearings provided in the frame members $m$ or in bearing members $o^1$ in such manner that they may be adjusted in position as by the movement of the spindle along a longitudinal slot provided in the said bearing member $o^1$. At the front of the apparatus the chains $n$ are carried in proximity to the rotatable elements $k$ and in such manner that transverse laths or screen elements $p$ of sheet metal may extend across the face of the slats $i$ when in the exposure positions. Four of such screen elements are indicated as carried by adjacent links of the chains $n$ and in their passage across the face of the slats $i$ in the exposure position serve to mask the movement of rotation of the elements $k$ effected by the Geneva stop devices. The screen elements $p$ are supported from the links of the chains $n$ by sheet metal angle brackets $p^1$ formed integrally with the inner links $n^1$ of the chains.

The Geneva stop devices $q$ for each pair of elements $k$ is carried upon a boss $k^3$ formed on the outer side of one of the elements $k$ at the front of the apparatus and rotation of the said devices is effected by pins $n^2$ provided in extension of the connecting pins $n^3$ of those links of the chains $n$ by which the screen members $p$ are supported.

Figure 3:
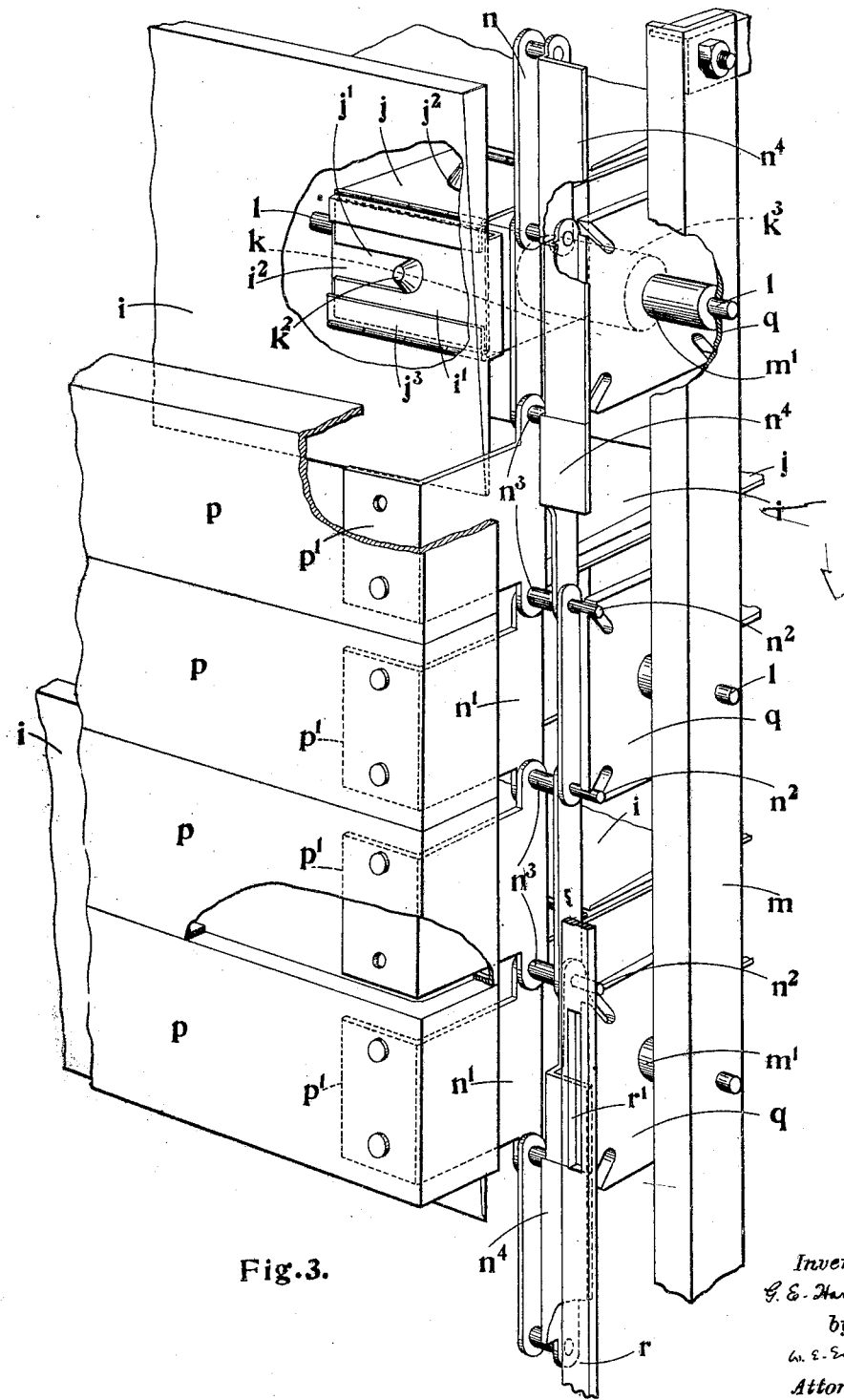

In order that the Geneva stops may be maintained stationary during the time that the slats are exposed the links of the chain $n$ adjacent the said stop devices other than those between the operating pins $n^2$ are formed with lateral extensions $n^4$ adapted to serve as a bearing surface against which the Geneva stops may engage, such bearing surface being supported by means of a bar $r$ or the like provided for the purpose, the said bar being recessed as at $r^1$ immediately opposite the Geneva stop devices to permit of their rotation. Those links next adjacent the operating pins $n^2$ may, if necessary, be provided with lateral extensions for half the length of the link only (as shown in Fig. 3) in order to provide clearance for the rotation of the Geneva stops.

In the case of apparatus disposed in elevated positions and constructed in the manner hereinbefore described, the rotatable elements upon the faces of which the respective sections of the pictures, advertisements or the like are applied or upon which endless bands are mounted in the manner described, are advantageously so set in position for exposure that the respective elements are substantially horizontal and have their upper edges protruding slightly in front of their lower edges so that inasmuch as the line of vision is directed upwardly, the top edge of each rotatable element obscures the lower edge of the next higher element. In the construction illustrated this effect is secured by the inclination of the slats $i$ with reference to the endless bands $j$ supporting them. This result is conveniently secured by the inclination of the seatings on the slats upon which the plates $i$ are applied. It may, however, be secured in any other convenient manner.

It will be understood that the invention comprises the constructional features which are hereinbefore described but it is not limited thereto. Thus in the construction described with respect to the drawings the width of the slats with respect to the length of side of the section of the elements $k$ may be greater in proportion than that indicated in the construction described.

I claim:

1. An apparatus for exhibiting advertisements and the like comprising a frame, a series of rotatable elements mounted in the said frame, the said elements respectively carrying parts of the advertisements to be exhibited and being disposed so that the parts of a particular advertisement may be presented in alignment, a screen movable before the said elements and along a continuous path, means for carrying and for effecting the movement of the said screen along the said path, and mechanism for imparting an intermittent angular movement to the respective rotatable elements in succession to effect a change in the advertisement, the said mechanism being operative to move an element only when the said element is obscured by the said screen, substantially as hereinbefore described.

2. An apparatus for exhibiting advertisements and the like comprising a frame, a series of rotatable elements mounted in the said frame, the said elements respectively carrying parts of the advertisements to be exhibited and being disposed so that the parts of a particular advertisement may be presented in alignment, a screen movable before the said elements and along a continuous path, parallel endless flexible elements carrying the said screen, means for effecting continuous movement of the said flexible elements in one direction, and mechanism for imparting an intermittent angular movement to the respective rotatable elements in succession to effect a change in the advertisement, the said mechanism being operative to move an element only when the said element is obscured by the said screen, substantially as hereinbefore described.

3. An apparatus for exhibiting advertisements and the like comprising a frame, a series of rotatable elements mounted in the said frame, the said elements respectively carrying parts of the advertisements to be exhibited and being disposed so that the parts of a particular advertisement may be presented in alignment, a screen, parallel endless flexible elements integrally connected to the said screen, and partly disposed in a plane parallel with and forward of the plane occupied by the aligned parts of the advertisement, means for effecting continuous movement of the said flexible elements in one direction and means mounted upon said flexible elements for imparting an intermittent angular movement to the respective rotatable elements in succession to effect a change in the advertisement, the said mechanism being operative to move an element only when the said element is obscured by the said screen, substantially as hereinbefore described.

4. An apparatus for exhibiting advertisements and the like comprising a frame, a series of rotatable elements mounted in the said frame, the said elements respectively carrying parts of the advertisements to be exhibited and being disposed so that the parts of a particular advertisement may be presented in alignment, parallel endless chains, partly disposed in a plane parallel with and forward of the plane occupied by the aligned parts of the advertisement, a series of parallel members forming a screen, said members being respectively integrally connected to adjacent links of the said chains, means for effecting continuous movement of the said chains in one direction and means mounted upon the said chains for imparting an intermittent angular movement to the respective rotatable elements in succession to effect a change in the advertisement, the said mechanism being operative to move an element only when the said element is obscured by the said screen, substantially as hereinbefore described.

5. An apparatus for exhibiting advertisements and the like comprising a frame, a series of rotatable elements mounted in the said frame, the said elements respectively carrying parts of the advertisements to be exhibited and being disposed so that the parts of a particular advertisement may be presented in alignment, operating members co-axial with and fixed relatively to the said elements, equidistant radially disposed slots on the said operating members, a screen, parallel endless chains carrying the said screen, and partly disposed in a plane parallel with and forward of the plane occupied by the aligned parts of the advertisement, means for effecting continuous movement of the said chains in one direction, pins mounted upon the said chains for engaging the said slots of the operating members and for imparting an intermittent angular movement of the said operating members in succession to effect a change in the advertisement presented when the rotatable elements are obscured by the said screen, and means for maintaining the said elements stationary in the aligned position before and after the said intermittent angular movement substantially as hereinbefore described.

GEORGE ERNEST HARTLEY.